United States Patent [19]

Naseem

[11] Patent Number: 4,892,683
[45] Date of Patent: Jan. 9, 1990

[54] FLAME RETARDANT LOW SMOKE POLY(VINYL CHLORIDE) THERMOPLASTIC COMPOSITIONS

[75] Inventor: Homaira Naseem, Leominster, Mass.

[73] Assignee: Gary Chemical Corporation, Leominster, Mass.

[21] Appl. No.: 196,326

[22] Filed: May 20, 1988

[51] Int. Cl.$^4$ .................. C09K 21/00; H01B 7/00; C08K 9/00; C08L 27/00

[52] U.S. Cl. .................. 252/609; 106/18.24; 106/18.25; 106/18.27; 106/18.35; 174/110 SR; 174/110 PM; 174/110 V; 174/113 R; 174/120 SR; 174/121 A; 174/121 SR; 252/602; 523/200; 523/206; 524/406; 524/423; 524/464; 524/567

[58] Field of Search ............... 523/200; 260/DIG. 24; 524/567, 568, 569, 406; 174/110 SR, 110 PM, 110 V, 113 R, 120 SR, 121 A, 121 SR; 106/18.94, 18.25, 18.27, 18.35

[56] References Cited

U.S. PATENT DOCUMENTS

| | | | |
|---|---|---|---|
| 3,341,628 | 9/1967 | Buning et al. | 260/899 |
| 3,566,009 | 2/1971 | Lamond et al. | 174/116 |
| 3,576,940 | 5/1971 | Stone et al. | 174/113 |
| 3,579,608 | 5/1971 | De Coste | 260/837 |
| 3,623,940 | 11/1971 | Gladstone et al. | 161/175 |
| 3,745,233 | 7/1973 | Lania et al. | 174/113 R |
| 3,823,255 | 7/1974 | LaGase et al. | 174/113 R |
| 3,845,166 | 10/1974 | Betts et al. | 260/897 C |
| 3,868,341 | 2/1975 | Sauer et al. | 260/23 XA |
| 3,869,420 | 3/1975 | Mathis et al. | 260/30.6 R |
| 3,900,533 | 8/1975 | Krackeler et al. | 260/897 A |
| 3,928,210 | 12/1975 | Peterson | 252/8.1 |
| 3,935,369 | 1/1976 | George et al. | 428/379 |
| 3,941,908 | 3/1976 | Valia et al. | 428/379 |
| 3,943,087 | 3/1976 | Leuchs | 260/30.6 R |
| 3,944,717 | 3/1976 | Hacker et al. | 174/23 C |
| 3,998,715 | 12/1976 | Bohm et al. | 204/159.16 |
| 4,008,368 | 2/1977 | Leuchs | 174/120 R |
| 4,018,983 | 4/1977 | Pedlow | 174/135 |
| 4,064,359 | 12/1977 | Peterson et al. | 174/107 |
| 4,080,404 | 3/1978 | Deets | 524/406 |
| 4,098,748 | 7/1978 | Moore et al. | 260/30.6 |
| 4,098,753 | 7/1978 | Tsigdinos et al. | 524/314 |
| 4,111,885 | 9/1978 | Abu-Isa | 524/314 |
| 4,225,649 | 9/1980 | Peterson | 428/383 |
| 4,328,152 | 5/1982 | Tsigdinos et al. | 524/406 |
| 4,331,733 | 5/1982 | Evans et al. | 428/379 |
| 4,381,364 | 4/1983 | Georgacopoulos et al. | 524/373 |
| 4,430,384 | 2/1984 | George | 428/377 |
| 4,462,831 | 7/1984 | Raevsky et al. | 106/18.26 |
| 4,544,685 | 10/1985 | Hoelzer | 523/200 |
| 4,696,967 | 9/1987 | Shedd et al. | 524/437 |

OTHER PUBLICATIONS

Desai, Orig. Coating Appl. Polym Sci. Proc., 48, pp. 806–810 (1983).
Moore, Soc. Plast. Eng. Tech. Rep., 23, pp. 216–227 (1977).
Moore, Fire Retard. Proc. Int. Sym., pp. 414–416 (1976).
Price, J. Vinyl Tech., 1, pp. 98–106 (1979).
Chem Abstracts, 87, 85704b.
Chem Abstracts, 87, 152861r.
Chem. Abstracts, 89, 111413u.
Chem Abstracts, 93, 169140b.
Chem Abstracts, 94, 137337a.
Chem Abstracts, 94, 176007n.
Chem Abstracts, 95, 204954k.
Chem Abstracts, 97, 24728x.
Chem Abstracts, 100, 122191s.
Chem Abstracts, 100, 140139k.
Chem Abstracts, 100, 140259z.
Chem Abstracts, 100, 140260t.
Chem Abstracts, 100, 211026j.
Chem Abstracts, 102, 79752c.
American Stand. Test Method #D2863-77, pp. 642–648.
American Stand. Test Method #D4100-82, pp. 484–494.
American Stand. Test Method #E662-83, pp. 686–714.
Carmoin, J. Macromol. Sci. Phys., B14(2), pp. 307–320 (1977).
Clark, Polymer Eng. & Sci., 22, pp. 698–704 (1982).
Bohn, Rubber Chemistry and Technology, 41, pp. 495–513 (1968).

Primary Examiner—Howard J. Locker
Attorney, Agent, or Firm—Weingarten, Schurgin, Gagnebin & Hayes

[57] ABSTRACT

Flame retardant low smoke PVC-based thermoplastic compositions for use in wire insulation and cable jacketing. The compositions include poly(vinyl chloride), an additional chlorinated resin, tribasic lead sulfate, a molybdenum-containing smoke suppressing material, alumina trihydrate, a brominated aromatic ester plasticizer, at least one additional plasticizer, and at least one lubricant.

15 Claims, No Drawings

FLAME RETARDANT LOW SMOKE POLY(VINYL CHLORIDE) THERMOPLASTIC COMPOSITIONS

FIELD OF THE INVENTION

This invention relates to flame retardant plastic materials, and more particularly, to flame retardant low smoke poly(vinyl chloride) compositions.

BACKGROUND OF THE INVENTION

Poly(vinyl chloride), hereafter referred to as PVC, is extensively used in wire insulation and sheathing for electric cables because of its ready availability, mechanical toughness, low cost, resistance to chemicals and weathering, and good dielectric properties.

In use, PVC is always plasticized to overcome its natural rigidity and permit it to be processed into a flexible material. In addition, other additives such as thermal stabilizers, lubricants, pigments, fillers, impact modifiers, and flame retardants are generally employed to produce PVC compositions having desired properties.

Unmodified PVC is thermally unstable, decomposing at about 150° C. to release HCl and produce sites of unsaturation in the polymer which lead to chain cross-linking and scission, resulting in degradation of the polymer's properties. As the PVC decomposes, the resin becomes discolored, brittle, and finally insoluble.

To improve thermal stabilitY, various thermal stabilizers are nearly always employed in PVC compositions. The stabilizers generally used are metallic salts of inorganic and organic acids and phenols, organometallics, epoxy compounds, and phosphates. In wire and cable applications, lead stabilization systems are widely used.

Despite its thermal instability, unmodified PVC has relatively good flame retardant properties due to its high chlorine content. However, the plasticizer necessary for flexibility and good processing properties generally increases the flammability of PVC compositions, especially if used at high levels. Moreover, when PVC burns, it produces considerable smoke, and the addition of flame retardant to plasticized compositions to reduce their flammability generally increases smoke generation upon burning. Smoke is particularly dangerous since it not only contains toxic by-products of combustion and thermal decomposition of the plastic, but also restricts visibility and disorients potential victims, resulting in panic.

A further problem with burning olefin-based polymers generally and PVC in particular is that when they burn they frequently flow and drip combustible materials, thus feeding and spreading the fire.

The plastics industry has long recognized that use of PVC in interior furnishings, building materials, and coverings for wire and cable presents the hazards of flame, toxic decomposition products, and smoke in the event of fire, as discussed above. It has therefore expended very considerable efforts to find additives for PVC which reduce thermal decomposition, flammability, and smoke in the event that such PVC compositions are subjected to high temperatures or flame.

Such research has yielded knowledge of several classes of stabilizers, flame retardants, smoke suppressants, plasticizers, etc., which function in PVC, and has disclosed many useful individual chemical compounds within those classes, but it has not yet provided a full understanding of how various additives interact with other additives in PVC and with PVC itself in PVC compositions exposed to high temperatures and/or flame. Accordingly, the preparation of PVC compositions having particular combinations of properties is largely an emperical art rather than a well developed science.

In the area of PVC-based compositions for wire and cable covering applications, it is very desirable to have materials which are highly flame-retardant, tend to char rather than drip when burned or heated, produce a minimum amount of smoke when burned, and produce light-colored smoke rather than dark smoke, while still possessing the good processing properties, mechanical toughness, and resistance to environmental stresses for which PVC compositions are known.

SUMMARY OF THE INVENTION

The above-stated need is met in the present invention, which provides PVC-based thermoplastic compositions which are strongly flame retardant, tend to char rather than drip when burned, produce only relatively small amounts of light-colored smoke when burned, and still possess good processing properties, toughness, and resistance to environmental stresses.

The flame retardant low smoke PVC-based compositions of the present invention include poly(vinyl chloride), an additional chlorinated resin, tribasic lead sulfate, a molybdenum-containing smoke suppressing material, alumina trihydrate, a brominated aromatic ester plasticizer, at least one additional plasticizer besides the brominated aromatic ester, and at least one lubricant.

DETAILED DESCRIPTION OF THE INVENTION

The flame retardant low smoke compositions of the present invention have as their base resin a mixture of PVC and an additional chlorinated resin. Throughout this specification, all amounts of composition ingredients, including the amounts of PVC and the additional chlorinated resin, will be expressed as parts per hundred of the sum of PVC and the additional chlorinated resin in the composition.

All ingredients comprising the compositions of this invention are commercially available materials, the identities of which are listed below:

a. GEON 102EP, a high viscosity, high molecular weight PVC, Chemical Abstracts Registry No. 9002-86-2, purchased from the B.F. Goodrich Company;

b. TEMPRITE 627X563, chlorinated poly(vinyl chloride) resin, purchased from the B.F. Goodrich Company;

c. CPE 631, a chlorinated polyethylene containing approximately 42% chlorine, Chemical Abstracts Registry No. 63231-66-3, purchased from the Dow Chemical Company;

d. TRIBASE, tribasic lead sulfate, Chemical Abstracts Registry No. 12202-17-4, a heat stabilizer purchased from Associated Lead, Inc.;

e. Ammonium octamolybdate, abbreviated later as AOM, a smoke suppressant having a Chemical Abstracts Registry No. 12411-64-2, purchased from Climax Molybdenum;

f. KEMGARD 911C, a smoke suppressant having a Chemical Abstracts Registry No. 76774-99-7, purchased from Sherwin Williams Company and believed to be a zinc molybdate produced by a reaction of molybdenum oxide and zinc oxide although the Chemical Abstracts computer record indicates that the formula for this material is unknown;

g. SOLEM 932, alumina trihydrate, a flame retardant and smoke suppressant having a Chemical Abstracts Registry No. 21645-51-2, purchased from Solem Industries;

h. DP 45, a proprietary brominated aromatic ester which is believed to be a brominated dioctyl phthalate and which is used as a flame retardant plasticizer, purchased from the Great Lakes Chemical Company;

i. TOPANOL CA, an antioxidant having the chemical name 4,4,4"-(1-methyl-1-propanyl-3-ylidene)tris(2-(1,1-dimethyl-ethyl))-5-methyl phenol, having the Chemical Abstracts Registry No. 1843-03-4, purchased from ICI America;

j. LSFR antimony trioxide, a low smoke flame retardant having the Chemical Abstracts Registry No. 1309-64-4, purchased from Lauryl Industries;

k. ELVALOY 741, a plasticizer which is a terpolymer of acrylic acid, ethylene, and vinyl acetate, Chemical Abstracts Registry No. 26713-18-8, purchased from DuPont;

l. SANTICIZER 148, a plasticizer comprising isodecyl diphenyl phosphate, this phosphate having the Chemical Abstracts Registry No. 29761-21-5, purchased from the Monsanto Chemical Company;

m. Dioctyl sebacate, a plasticizer having the Chemical Abstracts Registry No. 122-62-3, purchased from the C.P. Hall Company;

n. PX 336, a plasticizer having the chemical name n-octyl-n-decyl trimellitate, Chemical Abstracts Registry No. 34870-88-7, purchased from Aristech;

o. Stearic acid, a lubricant having the Chemical Abstracts Registry No. 57-11-4, purchased from Synthetic Products, Inc.;

p. DS 207, a dibasic lead stearate lubricant, Chemical Abstracts Registry No. 56189-09-4, purchased from Associated Lead, Inc.;

q. ARISTOWAX 65, a paraffin wax lubricant having the Chemical Abstracts Registry No. 8002-74-2, purchased from the Ross Corporation;

r. SP 33, a calcined aluminum silicate filler having the Chemical Abstracts Registry No. 39388-40-4, purchased from the Englehard Corporation;

In PVC-based thermoplastic materials, lead compounds such as dibasic lead phthalate and tribasic lead sulfate are frequently employed as heat stabilizers. However, other heat stabilizers can in principle be used, among them various proprietary soaps containing barium, cadmium, or zinc, such as MARK OHM, a barium cadmium soap. Organotin compounds may also be employed.

Similarly, other antioxidants besides TOPANOL CA may in principle be used, among them various IRGANOX materials, hindered phenols such as ETHYL 330 and bisphenol A, and hindered amines such as SEENOX 412S of Witco.

Likewise, besides ELVALOY 741, other plasticizers may in principle be used, among them such materials as triisooctyl trimellitate, HERCOFLEX 707, medium and high molecular weight polyester plasticizers such as SANTICIZER S429 and DRAPEX P-1 by Witco, and PLASTOLEINS 9780 and 9790 by Emery. Alternative trimellitate plasticizers include trioctyl trimellitate, and triisononyl trimellitate.

In place of SANTICIZER 148, other phosphate plasticizers such as triaryl phosphate and t-butylphenyl diphenylphosphate can be employed. Such materials are available from Monsanto. Similarly, dioctyl sebacate can be replaced with other ester-type plasticizers such as dioctyl adipate.

Besides the proprietary brominated aromatic ester DP 45, other highly halogenated materials can in principle be employed, among them decabromodiphenyl oxide, and SAYTECH BT93 and SAYTECH 120 from Ethyl Corporation.

A number of lubricants are known to be suitable for use in PVC-based compositions, so besides stearic acid, dibasic lead stearate, and the paraffin waxes, other materials such as AC 629A polyethylene wax may e employed.

Similarly, in place of alumina trihydrate, materials such as magnesium carbonate may be employed. Further, besides antimony trioxide, antimony oxide-containing materials such as ONGARD-2 of Anzon Inc. may be employed.

Besides SP 33 clay filler, others may in principle also be used, among them silicate fillers such as SATINTONE 2 and BURGESS 30 by Burgess.

The flame retardant low smoke compositions of the present invention include the following ingredients in the amounts listed:

poly(vinyl chloride) such as GEON 102EP, in an amount from about 60 to about 90 parts per hundred, and preferrably about 75 to about 90 parts per hundred of resin;

an additional chlorinated resin such as chlorinated poly(vinyl chloride) or chlorinated polyethylene, these materials not being equivalents for purposes of the wire insulation and cable jacketing formulations disclosed below and claimed, the additional chlorinated resin being employed in an amount from about 40 to about 10 parts per hundred, preferably from about 25 to about 10 parts per hundred of resin;

tribasic lead sulfate, in an amount from about 6 to about 12 parts per hundred, preferably about 8 to about 12 parts per hundred of resin;

a molybdenum-containing smoke suppressing material such as ammonium octamolybdate or zinc molybdate, these materials not being equivalents for purposes of the wire insulation and cable jacketing formulations disclosed below and claimed, the molybdenum-containing smoke suppressing material being employed in an amount from about 10 to about 30 parts per hundred, preferably about 15 to about 25 parts per hundred of resin;

alumina trihydrate, in an amount from about 10 to about 50 parts per hundred, preferably about 20 to about 50 parts per hundred of resin;

a brominated aromatic ester plasticizer, in an amount from about 10 to about 30 parts per hundred, preferrably about 15 to about 30 parts per hundred of resin;

at least one additional plasticizer besides the brominated aromatic ester, such additional plasticizer being efficacious in PVC-based plastic materials, the total amount of such additional plasticizer being from about 20 to about 45 parts per hundred, preferrably about 25 to about 40 parts per hundred of resin;

and at least one lubricant efficacious in PVC-based plastic materials, the total amount of such lubricants being from about 0.3 to about 1.5 parts per hundred, preferably about 0.4 to about 1.0 parts per hundred of resin.

The composition of the invention may also include the following materials:

at least one antioxidant efficacious in PVC-based plastic materials, a preferred antioxidant being TOPANOL CA, the total amount of such antioxidant being from about 0.15 to about 0.6 parts per hundred, and preferably from about 0.15 to about 0.4 parts per hundred of resin;

antimony trioxide, in an amount -from about 2 to about 8 parts per hundred, preferably from about 3 to about 6 parts per hundred of resin; and a filler such as a calcined aluminum silicate, in an amount from about 10 to about 30 parts per hundred, preferably about 15 to about 25 parts per hundred of resin.

The additional plasticizer or plasticizers besides the brominated aromatic ester are preferably selected from the group dioctyl sebacate, n-octyl-n-decyl trimellitate, an isodecyl diphenyl phosphate material such as that known commercially as SANTICIZER 148, and a terpolymer of acrylic acid, ethylene, and vinyl acetate such as that known commercially as ELVALOY 741. More particularly, the combination of dioctyl sebacate, n-octyl-n-decyl trimellitate, and DP 45 is advantageous, the DP 45 providing improved flame retardancy at the cost of increasing brittleness of the compositions, while the dioctyl sebacate provides compensating increases in flexibility at low temperatures and n-octyl-n-decyl trimellitate similarly increases flexibility at higher temperatures.

Lubricants useful in the composition of the invention are preferably materials such as stearic acid, dibasic lead stearate, and paraffin waxes.

The compositions of the invention may be embodied in formulations optimized for use as wire insulation and as cable jacketing, as shown below.

A wire insulation formula contains the following ingredients in the amounts listed:

PVC such as GEON 102EP, in an amount from about 60 to about 90 parts per hundred, preferably about 75 to about 90 parts per hundred of resin;

chlorinated polyethylene such as CPE 631, in an amount from about 40 to about 10 parts per hundred, preferably from about 25 to about 10 parts per hundred of resin;

tribasic lead sulfate such as TRIBASE, in an amount from about 6 to about 12 parts per hundred, preferably about 8 to about 12 parts per hundred of resin;

a zinc molybdate such as KEMGARD 911C, in an amount from about 10 to about 30 parts per hundred, preferably about 15 to about 25 parts per hundred of resin;

alumina trihydrate such as SOLEM 932M, in an amount from about 10 to about 30 parts per hundred, preferably about 20 to about 30 parts per hundred of resin;

a brominated aromatic ester such as DP 45, in an amount from about 10 to about 30 parts per hundred, preferably about 15 to about 20 parts per hundred of resin;

isodecyl diphenyl phosphate such as SANTICIZER 148, in an amount from about 5 to about 20 parts per hundred, preferably about 10 to about 15 parts per hundred of resin;

an antioxidant such as TOPANOL CA, in an amount from about 0.15 to about 0.6 parts per hundred, preferably about 0.15 to about 0.4 parts per hundred of resin;

a filler such as a calcined aluminum silicate, SP 33 for example, in an amount from about 10 to about 30 parts per hundred, preferably about 15 to about 25 parts per hundred of resin;

stearic acid, in an amount from about 0.15 to about 0.6 parts per hundred, preferably about 0.15 to about 0.4 parts per hundred of resin;

dibasic lead stearate such as DS 207, in an amount from about 0.15 to about 0.6 parts per hundred, preferably about 0.15 to about 0.4 parts per hundred of resin;

a paraffin wax such as ARISTOWAX 165, in an amount from about 0.15 to about 0.6 parts per hundred, preferably about 0.15 to about 0.4 parts per hundred of resin;

dioctyl sebacate, in an amount from about 4 to about 10 parts per hundred, preferably about 6 to about 8 parts per hundred of resin;

n-octyl-n-decyl trimellitate, PX 336 for example, in an amount from about 10 to about 30 parts per hundred, preferably from about 12 to about 20 parts per hundred of resin; and antimony trioxide, in an amount from about 2 to about 8 parts per hundred, preferably about 3 to about 6 parts per hundred of resin.

A cable jacketing formulation contains the following ingredients in the amounts listed:

PVC such as GEON 102EP in an amount from about 60 to about 90 parts per hundred, preferably about 75 to about 90 parts per hundred of resin;

a chlorinated PVC such as TEMPRITE 627X563, in an amount from about 40 to about 10 parts per hundred, preferably about 25 to about 10 parts per hundred of resin;

a terpolymer of acrylic acid, ethylene, and vinyl acetate, ELVALOY 741 for example, in an amount from about 10 to about 40 parts per hundred, preferably about 15 to about 25 parts per hundred of resin;

tribasic lead sulfate such as TRIBASE, in an amount from about 6 to about 12 parts per hundred, preferably about 8 to about 12 parts per hundred of resin;

ammonium octamolybdate, in an amount from about 10 to about 30 parts per hundred, preferably about 15 to about 25 parts per hundred of resin;

alumina trihydrate such as SOLEM 932M, in an amount from about 10 to about 50 parts per hundred, preferably about 20 to about 50 parts per hundred of resin;

a brominated aromatic ester such as DP 45, in an amount from about 10 to about 30 parts per hundred, preferably about 15 to about 30 parts per hundred of resin;

isodecyl diphenyl phosphate material, SANTICIZER 148 for example, in an amount from about 5 to about 20 parts per hundred, preferably about 6 to about 15 parts per hundred of resin;

an antioxidant such as TOPANOL CA, in an amount from about 0.15 to about 0.6 parts per hundred, preferably about 0.15 to about 0.4 parts per hundred of resin;

stearic acid, in an amount from about 0.15 to about 0.6 parts per hundred, preferably about 0.15 to about 0.4 parts hundred of resin;

dibasic lead stearate such as DS 207, in an amount from about 0.15 to about 0.6 parts per hundred, preferably about 0.15 to about 0.4 parts per hundred of resin;

a paraffin wax such as ARISTOWAX 165, in an amount from about 0.15 to about 0.6 parts per hundred, preferably about 0.15 to about 0.4 parts per hundred of resin;

dioctyl sebacate, in an amount from about 3 to about 10 parts per hundred, preferably about 6 to about 8 parts per hundred of resin;

n-octyl-n-decyl trimellitate, PX 336 for example, in an amount from about 8 to about 25 parts per hundred, preferably about 10 to about 20 parts per hundred of resin; and antimony trioxide, in an amount from about 2 to about 8 parts per hundred, preferably about 3 to about 6 parts per hundred of resin.

The compositions of the invention are prepared using steps that are individually known to those skilled in the art, in a manner known to the art. A steam heated blender is employed to mix the ingredients, then the initial blend is further processed in a Banbury high intensity mixer for a predetermined time at a predetermined temperature. Finally, the blend is dropped onto a hot two-roll mill, and ultimately stripped off the roll mill and diced. Twin screw extruders, continuous mixers, or other mixing equipment known to the art will also serve in place of the Banbury mixer.

EXPERIMENTAL

Formulations of the compositions of the invention optimized respectively for wire insulation and for cable jacketing were prepared as shown below. Ingredient amounts are shown as parts per hundred of the sum of PVC and the additional chlorinated resin employed, the units being abbreviated phr.

Tests for Oxygen Index and Specific Optical Density of Smoke were performed using ASTM standard test procedures D-2863 and E-662 respectively, and these test methods are expressly incorporated herein by reference.

PREPARATION OF WIRE INSULATION FORMULATION

Initially, 11 phr of SANTICIZER 148 plasticizer, 18 phr of DP 45 plasticizer, 6 phr of dioctyl sebacate plasticizer, and 15 phr of PX 336 plasticizer were mixed and preheated to 100° F. in a suitable container. This was added to 90 phr of GEON 102EP PVC in a blender, no additional heat being provided to the blender. Next, 10 phr of TRIBASE was added and the blender was heated with steam to dry the mixture, after which the blender was cooled by circulating water through it.

Next, 25 phr of SOLEM 932M, 20 phr of KEMGARD 911C, 20 phr of SP 33, 3 phr of LSFR antimony trioxide, 0.2 phr of TOPANOL CA, 0.2 phr of stearic acid, 0.2 phr of DS 207, and 0.2 phr of ARISTOWAX 165 were added and mixed for ten minutes. Finally, 10 phr of CPE 631 was added and the blend was processed on a Banbury mixer for approximately 150 seconds at 350° F. then dropped on a hot two-roll mill, subsequently stripped off, and diced.

The resulting composition exhibited an oxygen index of 41.3% and maximum smoke specific optical densities of 260 (flaming) and 290 (smoldering).

PREPARATION OF CABLE JACKETING FORMULATION

Initially, 25 phr of DP 45, 5 phr of dioctyl sebacate, 12 phr of PX 336, and 8 phr of SANTICIZER 148 were preheated at 150° F. in a suitable container. This mixture was added to a mixture of 85 phr of GEON 102EP, 15 phr of TEMPRITE 627X563, and 10 phr of TRIBASE in a blender, which was heated with steam and run until the mixture was dry. The blender was cooled by circulating water through it, then 45 phr of SOLEM 932M, 25 phr of ammonium octamolybdate, 3 phr of LSFR antimony trioxide, 0.2 phr of TOPANOL CA, 0.2 phr of stearic acid, 0.2 phr of DS 207, and 0.2 phr of ARISTOWAX 165 were added, and mixed for ten minutes. The blend was then transferred to a Banbury mixer along with 12 phr of ELVALOY 741 and mixed for approximately 150 seconds at temperature of approximately 340° F., then dropped on a hot two-roll mill, subsequently stripped off, and diced.

The resulting composition exhibited an oxygen index of 50% and maximum smoke specific optical densities of 233 (flaming) and 275 (smoldering).

TEST FORMULATIONS OF THE COMPOSITION OF THE INVENTION

The compositions shown in Tables I and II below were prepared according to the above procedures employing the listed relative amounts of ingredients. Table I shows a number of experimental preparations of wire insulation formulation of the above composition. Table II similarly shows several experimental preparations of cable jacketing formulations of the basic composition.

TABLE I

| Ingredients | WIRE INSULATION FORMULATIONS* | | | | | | |
|---|---|---|---|---|---|---|---|
|  | A | B | C | D | E | F | G |
| GEON 102EP | 90 | 80 | 90 | 90 | 90 | 90 | 70 |
| CPE 631 | 10 | 20 | 10 | 10 | 10 | 10 | 30 |
| TRIBASE | 10 | 10 | 10 | 10 | 10 | 10 | 10 |
| KEMGARD 911C | 20 | 20 | 20 | 10 | 20 | 35 | 25 |
| SP 33 | 20 | 20 | 10 | 10 | 20 | 20 | 20 |
| SOLEM 932M | 25 | 25 | 25 | 35 | 25 | 15 | 35 |
| TOPANOL CA | 0.2 | 0.2 | 0.2 | 0.2 | 0.2 | 0.2 | 0.2 |
| Stearic Acid | 0.2 | 0.2 | 0.2 | 0.2 | 0.2 | 0.2 | 0.2 |
| DS 207 | 0.2 | 0.2 | 0.2 | 0.2 | 0.2 | 0.2 | 0.2 |
| ARISTOWAX 165 | 0.2 | 0.2 | 0.2 | 0.2 | 0.2 | 0.2 | 0.2 |
| SANTICIZER 148 | 11 | 11 | 11 | 11 | 7 | 11 | 11 |
| DP 45 | 18 | 18 | 18 | 18 | 22 | 18 | 18 |
| Dioctyl Sebacate | 6 | 6 | 6 | 6 | 6 | 6 | 6 |
| PX 336 | 15 | 15 | 15 | 15 | 15 | 15 | 15 |
| LSFR Antimony Oxide | 3 | 3 | 3 | 3 | 3 | 3 | 3 |
| Oxygen Index | 41.3 | 40.5 | 40.0 | 43.0 | 42.5 | 39.5 | 41.0 |
| Smoke Optical Density (sample thickness 100 mils): | | | | | | | |
| $D_m$ (corr.) Flaming | 260 | 245 | 268 | 270 | 275 | 250 | 250 |
| $D_m$ (corr.) Smoldering | 290 | 280 | 295 | 300 | 296 | 275 | 285 |

*Amounts of ingredients are expressed as parts per hundred of the sum of PVC and CPE employed.

TABLE II

CABLE JACKETING FORMULATIONS*

| Ingredients | A | B | C | D | E | F | G |
|---|---|---|---|---|---|---|---|
| GEON 102 EP | 85 | 85 | 85 | 85 | 100 | 70 | 80 |
| TEMPRITE 627X563 | 15 | 15 | 15 | 15 | — | 30 | 20 |
| ELVALOY 741 | 12 | 18 | 18 | 12 | 22 | 12 | 12 |
| TRIBASE | 10 | 10 | 10 | 10 | 10 | 10 | 10 |
| AOM | 25 | 20 | 20 | 20 | 25 | — | 25 |
| SOLEM 932M | 45 | 35 | 35 | 35 | 45 | 45 | 45 |
| TOPANOL CA | 0.2 | 0.2 | 0.2 | 0.2 | 0.2 | 0.2 | 0.2 |
| Stearic Acid | 0.2 | 0.2 | 0.2 | 0.2 | 0.3 | 0.2 | 0.2 |
| DS 207 | 0.2 | 0.2 | 0.2 | 0.2 | 0.2 | 0.2 | 0.2 |
| ARISTOWAX 165 | 0.2 | 0.2 | 0.2 | 0.2 | 0.2 | 0.2 | 0.2 |
| SANTICIZER 148 | 8 | 10 | 10 | 10 | 10 | 8 | 12 |
| DP 45 | 25 | 22 | 18 | 25 | 18 | 25 | 18 |
| Dioctyl Sebacate | 5 | 5 | 5 | 5 | 5 | 5 | 8 |
| PX 336 | 12 | 15 | 15 | 15 | 15 | 12 | 12 |
| LSFR Antimony Oxide | 3 | 3 | 3 | 3 | 3 | 3 | 3 |
| Oxygen Index | 50 | 48 | 45 | 49 | 45 | 50.5 | 47 |
| Smoke Optical Density (sample thickness 100 mils): | | | | | | | |
| $D_m$ (corr.) Flaming | 233 | 250 | 248 | 255 | 210 | 240 | 215 |
| $D_m$ (corr.) Smoldering | 275 | 290 | 280 | 288 | 250 | 280 | 248 |

*Amounts of ingredients are expressed as parts per hundred of the sum of PVC and chlorinated PVC employed.

An experimental preparation like preparation A of Table II except that 25 phr of KEMGARD 911C was employed in place of the AOM gave a composition having an Oxygen Index of 49.5%, and Smoke Optical Densities as follows: $D_m$ (corr.) flaming—255; $D_m$ (corr.) smoldering—290. This was judged unsuitable for the intended purpose.

What is claimed is:

1. A flame retardant smoke-suppressed thermoplastic composition comprising the below-listed materials, amounts being expressed as parts per hundred of the sum of poly(vinyl chloride) and chlorinated polyethylene resins in the composition:
   poly(vinyl chloride), in an amount from about 60 to about 90 parts per hundred of resin;
   chlorinated polyethylene, in an amount from about 40 to about 10 parts per hundred of resin;
   tribasic lead sulfate, in an amount from about 6 to about 12 parts per hundred of resin;
   a zinc molybdate, in an amount from about 10 to about 30 parts per hundred of resin;
   alumina trihydrate, in an amount from about 10 to about 30 parts per hundred of resin;
   a brominated aromatic ester plasticizer, in an amount from about 10 to about 30 parts per hundred of resin;
   at least one additional plasticizer besides said brominated aromatic ester, said at least one additional plasticizer being efficacious in PVC-based plastic materials; and
   at least one lubricant efficacious in PVC-based plastic materials.

2. The composition of claim 1 further comprising at least one antioxidant efficacious in PVC-based plastic materials, the amount of said at least one antioxidant being from about 0.15 to about 0.6 parts per hundred of resin.

3. The composition of claim 2 wherein said at least one antioxidant comprises 4,4′,4″-(1-methyl-1-propanyl-3-ylidene) tris(2-(1,1-dimethylethyl))-5-methyl phenol.

4. The composition of claim 1 further comprising antimony trioxide in an amount from about 2 to about 8 parts per hundred of resin.

5. The composition of claim 1 wherein said at least one additional plasticizer is selected from the group consisting of dioctyl sebacate, n-octyl-n-decyl trimellitate, and isodecyl diphenyl phosphate.

6. The composition of claim 1 wherein said at least one lubricant is selected from the group consisting of stearic acid, dibasic lead stearate, and paraffin waxes.

7. The composition of claim 1 further comprising at least one filler suitable for use in PVC-based plastic materials, the total amount of said fillers in said thermoplastic composition being from about 10 to about 30 parts per hundred of resin.

8. A flame retardant smoke-suppressed thermoplastic composition comprising the below-listed materials, amounts being expressed as parts per hundred of the sum of poly(vinyl chloride) and chlorinated poly(vinyl chloride) resins in the composition:
   poly(vinyl chloride), in an amount from about 60 to about 90 parts per hundred resin;
   chlorinated poly(vinyl chloride), in an amount from about 40 to about 10 parts per hundred of resin;
   a plasticizer which is a terpolymer of acrylic acid, ethylene, and vinyl acetate, in an amount from about 10 to about 40 parts per hundred of resin;
   tribasic lead sulfate, in an amount from about 6 to about 12 parts per hundred of resin;
   ammonium octamolybdate, in an amount from about 10 to about 30 parts per hundred of resin;
   alumina trihydrate, in an amount from about 10 to about 50 parts per hundred of resin;
   a brominated aromatic ester plasticizer, in an amount from about 10 to about 30 parts per hundred of resin;
   at least one additional plasticizer besides said brominated aromatic ester and said terpolymer of acrylic acid, ethylene, and vinyl acetate, said at least one additional plasticizer being efficacious in PVC-based plastic materials; and
   at least one lubricant efficacious in PVC-based plastic materials.

9. The composition of claim 8, further comprising:
   at least one antioxidant efficacious in PVC-based material, in an amount from about 0.15 to about 0.15 to about 0.6 parts per hundred of resin.

10. The composition of claim 9 wherein said at least one antioxidant comprises 4,4′, 4″-(1-methyl-1-propanyl-3-ylidene) tris(2-(1,1-dimethylethyl))-5-methyl phenol.

11. The composition of claim 8 further comprising antimony trioxide in an amount from about 2 to about 8 parts per hundred of resin.

12. The composition of claim 8 wherein said additional plasticizer is selected from the group consisting of dioctyl sebacate, n-octyl-n-decyl trimellitate, and isodecyl diphenyl phosphate.

13. The composition of claim 8 wherein said lubricant is selected from the group consisting of stearic acid, dibasic lead stearate, and paraffin waxes.

14. An insulated wire comprising:
at least one electrically conductive wire and an insulation about said at least one wire, said insulation comprising the thermoplastic composition of claim 1.

15. A jacketed electrical cable comprising:
at least one electrical cable and cable jacketing about said at least one cable, said cable jacketing comprising the thermoplastic composition of claim 8.

* * * * *

UNITED STATES PATENT AND TRADEMARK OFFICE
CERTIFICATE OF CORRECTION

PATENT NO. : 4,892,683
DATED : January 9, 1990
INVENTOR(S) : Homaira Naseem

It is certified that error appears in the above-identified patent and that said Letters Patent is hereby corrected as shown below:

Column 1, line 29, "stabilitY," should read --stability,--.

Column 3, line 13, "4,4,4"" should read --4, 4', 4"--.

Column 4, line 13, "may e" should read --may be--.

Column 5, line 7, "-from" should read --from--.

Signed and Sealed this

Ninth Day of November, 1993

Attest:

BRUCE LEHMAN

Attesting Officer     Commissioner of Patents and Trademarks